(12) United States Patent
Ren et al.

(10) Patent No.: US 12,143,338 B2
(45) Date of Patent: Nov. 12, 2024

(54) METHODS AND APPARATUSES FOR DETERMINING CHANNEL STATE INFORMATION INTERFERENCE MEASUREMENT RESOURCES

(71) Applicant: Telefonaktiebolaget LM Ericsson (publ), Stockholm (SE)

(72) Inventors: Hong Ren, Kanata (CA); Wei Wang, Kanata (CA); Yongquan Qiang, Ottawa (CA); Ali Afana, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/775,356

(22) PCT Filed: Apr. 30, 2021

(86) PCT No.: PCT/IB2021/053608
§ 371 (c)(1),
(2) Date: May 9, 2022

(87) PCT Pub. No.: WO2022/229680
PCT Pub. Date: Nov. 3, 2022

(65) Prior Publication Data
US 2024/0154772 A1 May 9, 2024

(51) Int. Cl.
*H04L 5/00* (2006.01)
*H04B 7/06* (2006.01)

(52) U.S. Cl.
CPC .......... *H04L 5/0073* (2013.01); *H04L 5/0005* (2013.01); *H04B 7/0626* (2013.01)

(58) Field of Classification Search
CPC ... H04L 5/0073; H04L 5/0005; H04L 5/0007; H04L 5/0048; H04B 7/0626; H04W 16/14
See application file for complete search history.

(56) References Cited

U.S. PATENT DOCUMENTS

| | | | | |
|---|---|---|---|---|
| 2013/0208604 A1* | 8/2013 | Lee | ........................ | H04W 24/10 370/252 |
| 2014/0094185 A1* | 4/2014 | Yiu | ........................ | H04L 1/1893 455/453 |

(Continued)

FOREIGN PATENT DOCUMENTS

WO    2020/058743 A1    3/2020

OTHER PUBLICATIONS

"Interference Measurement Methods in 5G NR: Principles and Performance"; Elgendi et al.; 2019 16th International Symposium on Wireless Communication Systems (ISWCS); Oct. 2019 (Year: 2019).*

(Continued)

*Primary Examiner* — Benjamin H Elliott, IV
(74) *Attorney, Agent, or Firm* — Weisberg I.P. Law, P.A.

(57) ABSTRACT

Embodiments described herein provided methods and apparatuses for determining Channel State Information Interference Measurement resources, CSI-IM resources, for interference measurement, wherein a New Radio, NR, base station is spectrum sharing with a Long Term Evolution, LTE, base station. A method in an NR base station includes determining a CSI-IM pattern for a CSI-IM resource, wherein the CSI-IM pattern is defined by one or more first OFDM symbols and a first frequency shift; and transmitting a Channel State Information Reference Signal, CSI-RS, according to a CSI-RS pattern, wherein the CSI-RS pattern is defined by a second OFDM symbol and a second frequency shift, wherein the first frequency shift and the second frequency shift do not overlap and wherein the one or more first OFDM symbols overlap with the second OFDM symbol.

26 Claims, 18 Drawing Sheets

---

Determine one or more CSI-IM resources according to a CSI-IM pattern; wherein the one or more CSI-IM resources are placed in a first non- Multicast Broadcast Single Frequency Network, MBSFN, subframe, and wherein the first non-MBSFN subframe is determined utilizing a mapping function that maps a cell identification of the NR base station to the first non-MBSFN subframe ⟋1501

(56) References Cited

U.S. PATENT DOCUMENTS

| | | | | |
|---|---|---|---|---|
| 2015/0327287 A1* | 11/2015 | Kim | ...................... | H04B 7/024 |
| | | | | 370/329 |
| 2017/0063503 A1* | 3/2017 | Liu | ...................... | H04L 5/0048 |
| 2017/0126300 A1* | 5/2017 | Park | ...................... | H04L 5/0048 |
| 2019/0090126 A1* | 3/2019 | Hayashi | ................ | H04W 74/02 |
| 2019/0281487 A1* | 9/2019 | Liu | ...................... | H04W 24/10 |
| 2021/0203464 A1* | 7/2021 | Ren | ...................... | H04L 5/0007 |
| 2022/0060265 A1* | 2/2022 | Xu | ...................... | H04L 5/0094 |
| 2022/0086844 A1* | 3/2022 | Rassam | ............... | H04W 72/541 |
| 2023/0056263 A1* | 2/2023 | Kim | ...................... | H04L 5/0048 |
| 2023/0300868 A1* | 9/2023 | Ma | ...................... | H04B 17/345 |
| | | | | 370/252 |
| 2023/0422073 A1* | 12/2023 | Liu | ...................... | H04L 5/0057 |
| 2024/0154772 A1* | 5/2024 | Ren | ...................... | H04L 5/0007 |

OTHER PUBLICATIONS

Invitation to Pay Additional Fees and, Where Applicable, Protest Fee dated Jan. 28, 2022 issued in PCT Application No. PCT/IB2021/053608, consisting of 17 pages.
International Search Report and Written Opinion dated Mar. 28, 2022 issued in PCT Application No. PCT/IB2021/053608, consisting of 22 pages.
Mediatek, 5G NR and 4G LTE Coexistence; A Comprehensive Deployment Guide to Dynamic Spectrum Sharing dated Mar. 3, 2020, consisting of 30 pages.
3GPP TSG-RAN WG1 #91; R1-1720733; Source: Ericsson; Title: On Remaining Details of CSI Measurement; Agenda Item: 7.2.2.1; Document for: Discussion and Decision, Reno, USA, Nov. 27-Dec. 1, 2017, consisting of 10 pages.

* cited by examiner

Illustration of ESS solution

Determine one or more CSI-IM resources according to a CSI-IM pattern; wherein the one or more CSI-IM resources are placed in a first non- Multicast Broadcast Single Frequency Network, MBSFN, subframe, and wherein the first non-MBSFN subframe is determined utilizing a mapping function that maps a cell identification of the NR base station to the first non-MBSFN subframe — 1501

Fig. 15

METHODS AND APPARATUSES FOR DETERMINING CHANNEL STATE INFORMATION INTERFERENCE MEASUREMENT RESOURCES

CROSS-REFERENCE TO RELATED APPLICATION

This application is a Submission Under 35 U.S.C. § 371 for U.S. National Stage Patent Application of International Application Number: PCT/IB2021/053608, filed Apr. 30, 2021 entitled "METHODS AND APPARATUSES FOR DETERMINING CHANNEL STATE INFORMATION INTERFERENCE MEASUREMENT RESOURCES," the entirety of which is incorporated herein by reference.

TECHNICAL FIELD

Embodiments described herein relate to methods and apparatuses for determining Channel State Information Interference Measurement, CSI-IM resources, for interference measurement, wherein an NR base station is spectrum sharing with a Long Term Evolution, LTE, base station.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the evolution of NR technology, spectrum sharing between Long Term Evolution (LTE) and New Radio (NR) has been introduced in lower frequency bands given the high penetration of existing LTE users and to fulfill the need of operating NR. There are several different ways that the spectrum can be shared between LTE and NR. In Ericsson Spectrum Sharing (ESS), instant spectrum sharing is proposed such that the spectrum allocated to each Radio Access Technology (RAT) may change every subframe based on traffic demand from each RAT. The spectrum may be shared between LTE and NR in both frequency and time domain, as illustrated in FIG. 1.

In NR, Channel State Information Reference Signals (CSI-RS) are the reference signals typically used by the wireless devices (which may also be referred to as user equipments (UEs)) to acquire channel state information. It is a set of resources configured by a base station and indicated to the wireless devices for CSI measurement purposes. For different numbers of antenna ports, the resources reserved for CSI-RS are different and configurable by RRC message.

Channel State information Interference Measurement (CSI-IM) resources are a set of specific resources introduced as an approach for providing interference measurements. The resources are configurable by RRC message. For example, two CSI-IM patterns within an RB are defined in 3GPP that may be configured to the UE.

An example of a CSI-RS pattern and a first CSI-IM pattern in a resource block for 4 transmission antenna ports is illustrated in FIG. 2. The striped resource elements (REs) are CSI-IM resources, and the dotted REs are CSI-RS resources.

An example of a CSI-RS pattern and a second CSI-IM pattern in a resource block for 4 transmission antenna ports is illustrated in FIG. 3. The striped resource elements (REs) are CSI-IM resources, and the dotted REs are CSI-RS resources.

In NR, the reference signals designed specifically for NR UEs are not backward compatible to LTE UEs. These reference signals may normally span the entire spectrum with a few REs in each resource block. Therefore, as part of the spectrum sharing solution, Multimedia Broadcast multicast service Single Frequency Network (MBSFN) subframes may be utilized. MBSFN subframes are special subframes configured and used for Multimedia Broadcast Multicast Services (MBMS) transmissions in LTE. However, if an MBSFN subframe is configured but not used for MBMS traffic, it may be used for spectrum sharing purposes.

For example, during an MBSFN subframes in LTE, NR reference signals such as TRS, CSI-RS may be transmitted, and CSI-IM resources may be placed. LTE Physical Downlink Shared Channel (PDSCH) however, is not scheduled during the MBSFN subframes. Since LTE wireless devices will not be scheduled in MBSFN, the NR reference signals will not impact on LTE PDSCH decoding.

In non-MBSFN subframes:
  For 4Tx deployment, the first two symbols may be reserved for LTE wireless devices for the transmission of LTE Cell Specific reference Signals (CRS) and control channel. For the other 12 symbols, the spectrum may be shared dynamically between LTE and NR wireless devices based on traffic demand.
  For 2Tx deployment, the first symbol may be reserved for LTE wireless devices for the transmission of LTE CRS and control channel. For the other 13 symbols, the spectrum may be shared dynamically between LTE and NR wireless devices based on traffic demand.
  There are no other NR reference signals transmitted in non-MBSFN.

The existing ESS solution configures CSI-IM in an MBSFN slot. The MBSFN slot including CSI-IM may be configured for example, every 20 ms, which is the same as the periodicity of CSI-IM. More specifically, assuming a time synchronized network, the MBSFN may also be allocated in a fixed subframe which is aligned among all the cells, as shown FIG. 4.

However, as an MBSFN slot is aligned among all the cells, and only NR traffic will be scheduled in MBSFN slot, the inter-cell interference measured based on CSI-IM during the MBSFN slot is incomplete. In other words, the interference measurements made during the MBSFN slots may only reflect the interference from MBSFN in neighboring cells where only NR interference is captured. This results in incorrect channel quality measurements at the UE as the UE may regularly only capture NR neighbor interference.

For example, if there is NR traffic scheduled in MBSFN, then the interference from NR may be measured.

For example, if the CSI-IM overlaps with PDSCH in neighboring cells, then the interference from PDSCH can be measured. If, for example, there is no NR traffic in an MBSFN subframe, then no NR interference may be measured.

In current networks LTE traffic is much greater than NR traffic and creates very high downlink (DL) inter-cell interference. Due to the current solution as described above, this LTE interference is not measured and reported by UE, which results in higher than actual channel quality measurements. This optimistic channel quality is then used by gNB to perform link adaptation, which results in a higher Modulation and Coding Scheme (MCS) for non-MBSFN slots than the UE can handle. This is turn may create Cyclic Redundancy Check (CRC) errors, resulting in more retransmissions, reducing throughput and increasing Physical Downlink Control Channel (PDCCH) usage.

Another problem with the current solution is that even the interference from NR can be underestimated. As shown in the FIGS. 2 and 3, CSI-IM and CSI-RS are configured in different resource elements. This means CSI-IM may see the interference from NR PDSCH if it is scheduled but may never see the interference from NR CSI-RS where it is the dominating interference if there is no NR traffic in neighboring cells. If it happens that only a few resource blocks (RBs) are used by NR in the MBSFN subframe in which CSI-RS is transmitted, the interference from NR may be underestimated.

It will therefore be appreciated, that using the current solution, LTE traffic load and CRS are always not reflected in the interference measurement results as they are transmitted in other non-MBSFN subframes. In non-MBSFN, LTE CRS is always transmitted regardless of LTE traffic. Furthermore, the spectrum is dynamically shared between LTE and NR UEs which means the interference from non-MBSFN consists from LTE and/or NR. It will therefore be apparent that MBSFN and non-MBSFN are experiencing different level of interference based on spectrum sharing split changing along time domain where LTE and/or NR traffic could be the major contributor of the interference.

SUMMARY

According to some embodiments there is provided a method in a new radio, NR, base station for determining Channel State Information Interference Measurement resources, CSI-IM resources, for interference measurement, wherein the NR base station is spectrum sharing with a Long Term Evolution, LTE, base station. The method comprises determining a CSI-IM pattern for a CSI-IM resource, wherein the CSI-IM pattern is defined by one or more first OFDM symbols and a first frequency shift; and transmitting a Channel State Information Reference Signal, CSI-RS, according to a CSI-RS pattern, wherein the CSI-RS pattern is defined by a second OFDM symbol and a second frequency shift, wherein the first frequency shift and the second frequency shift do not overlap and wherein the one or more first OFDM symbols overlap with the second OFDM symbol.

According to some embodiments there is provided a method in a new radio, NR, base station for determining Channel State Information Interference Measurement resources, CSI-IM resources, for interference measurement, wherein the NR base station is spectrum sharing with a Long Term Evolution, LTE, base station. The method comprises setting a first non-Multicast Broadcast Single Frequency Network, MBSFN, subframe as a cell specific MBSFN subframe; wherein the first non-MBSFN subframe is selected based on a mapping function that maps a cell identification associated with the NR base station to the first non-MBSFN subframe; and placing at least one CSI-IM resource in the cell specific MBSFN subframe.

According to some embodiments there is provided a method in a new radio, NR, base station for determining Channel State Information Interference Measurement resources, CSI-IM resources, for interference measurement, wherein the NR base station is spectrum sharing with a Long Term Evolution, LTE, base station. The method comprises determining one or more CSI-IM resources according to a CSI-IM pattern; wherein the one or more CSI-IM resources are placed in a first non-Multicast Broadcast Single Frequency Network, MBSFN, subframe, and wherein the first non-MBSFN subframe is determined utilizing a mapping function that maps a cell identification of the NR base station to the first non-MBSFN subframe.

According to some embodiments there is provided a new radio, NR, base station for determining Channel State Information Interference Measurement resources, CSI-IM resources, for interference measurement, wherein the NR base station is spectrum sharing with a Long Term Evolution, LTE, base station. The NR base station comprises processing circuitry configured to: determine a CSI-IM pattern for a CSI-IM resource, wherein the CSI-IM pattern is defined by one or more first OFDM symbols and a first frequency shift; and transmit a Channel State Information Reference Signal, CSI-RS, according to a CSI-RS pattern, wherein the CSI-RS pattern is defined by a second OFDM symbol and a second frequency shift, wherein the first frequency shift and the second frequency shift do not overlap and wherein the one or more first OFDM symbols overlap with the second OFDM symbol.

According to some embodiments there is provided a new radio, NR, base station for determining Channel State Information Interference Measurement resources, CSI-IM resources, for interference measurement, wherein the NR base station is spectrum sharing with a Long Term Evolution, LTE, base station. The NR base station comprises processing circuitry configured to: set a first non-Multicast Broadcast Single Frequency Network, MBSFN, subframe as a cell specific MBSFN subframe; wherein the first non-MBSFN subframe is selected based on a mapping function that maps a cell identification associated with the NR base station to the first non-MBSFN subframe; and place at least one CSI-IM resource in the cell specific MBSFN subframe.

According to some embodiments there is provided a new radio, NR, base station for determining Channel State Information Interference Measurement resources, CSI-IM resources, for interference measurement, wherein the NR base station is spectrum sharing with a Long Term Evolution, LTE, base station. The NR base station comprises processing circuitry configured to: determine one or more CSI-IM resources according to a CSI-IM pattern; wherein the one or more CSI-IM resources are placed in a first non-Multicast Broadcast Single Frequency Network, MBSFN, subframe, and wherein the first non-MBSFN subframe is determined utilizing a mapping function that maps a cell identification of the NR base station to the first non-MBSFN subframe.

BRIEF DESCRIPTION OF THE DRAWINGS

For a better understanding of the embodiments of the present disclosure, and to show how it may be put into effect, reference will now be made, by way of example only, to the accompanying drawings, in which:

FIG. 15 illustrates a method in a new radio, NR, base station for determining Channel State Information Interference Measurements resources, CSI-IMs resources, for interference measurement, wherein the NR base station is spectrum sharing with a Long Term Evolution, LTE, base station;

DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein propose methods and apparatuses for measuring both LTE and NR interference. These methods and apparatuses therefore minimize the chance that NR interference is underestimated.

It will be appreciated that herein a spectrum sharing cell refers to a cell that provides both LTE and NR services. Both LTE and NR signals/channels may be transmitted by the spectrum sharing cell.

Figure 5:
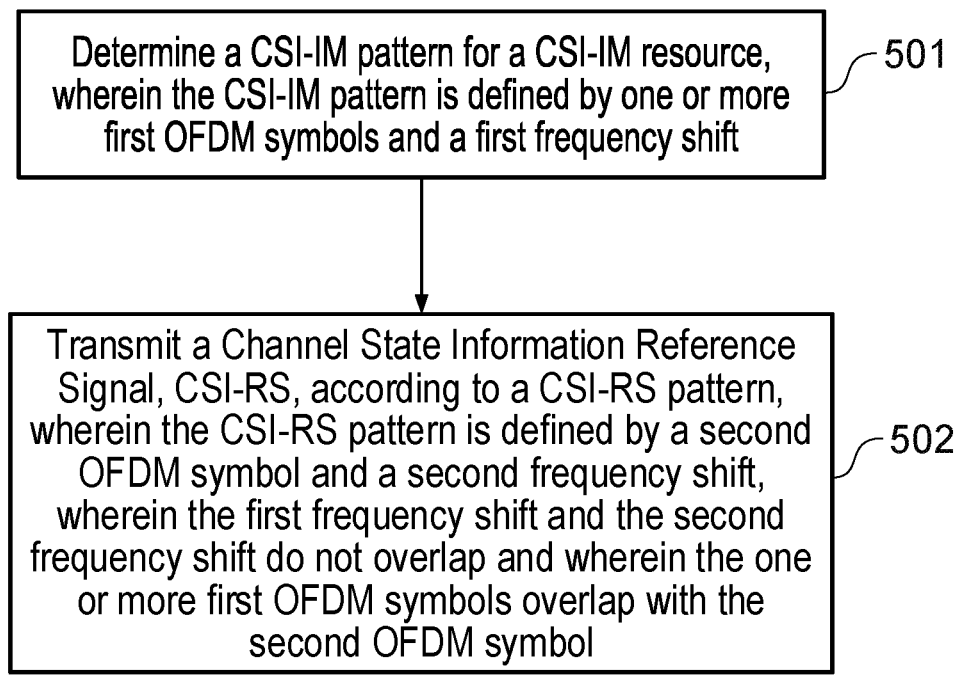
FIG. 5 illustrates a method in a new radio, NR, base station for determining Channel State Information Interference Measurement, CSI-IM resources, for interference measurement, wherein the NR base station is spectrum sharing with a Long Term Evolution, LTE, base station.

FIG. 5 illustrates a method in a new radio, NR, base station for determining Channel State Information Interference Measurement, CSI-IM resources, for interference measurement, wherein the NR base station is spectrum sharing with a Long Term Evolution, LTE, base station.

In step 501, the method comprises determining a CSI-IM pattern for a CSI-IM resource, wherein the CSI-IM pattern is defined by one or more first Orthogonal Frequency Division Multiplexing (OFDM) symbols and a first frequency shift. The one or more first OFDM symbols in a time domain may be fixed or predetermined.

In step 502, the method comprises transmitting a Channel State Information Reference Signal, CSI-RS, according to a CSI-RS pattern, wherein the CSI-RS pattern is defined by a second OFDM symbol and a second frequency shift, wherein the first frequency shift and the second frequency shift do not overlap. The one or more first OFDM symbols and the second OFDM symbol do overlap.

Figure 1:
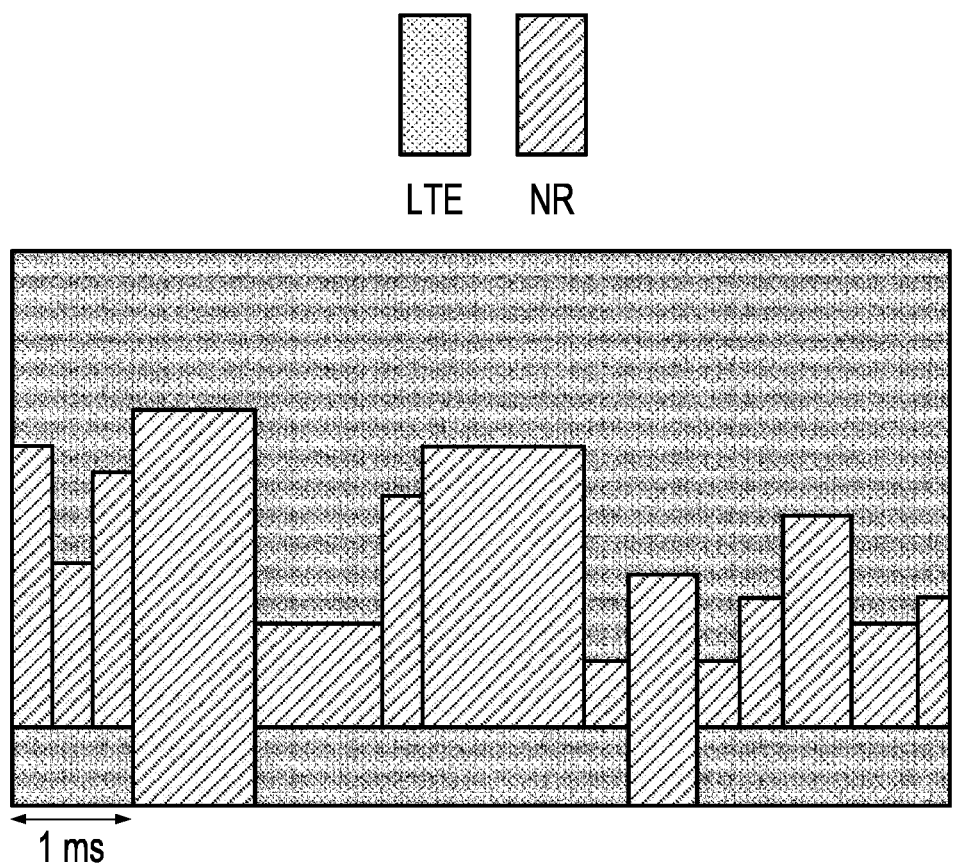
FIG. 1 illustrates spectrum sharing between LTE and NR in both frequency and time domain.
Figure 2:
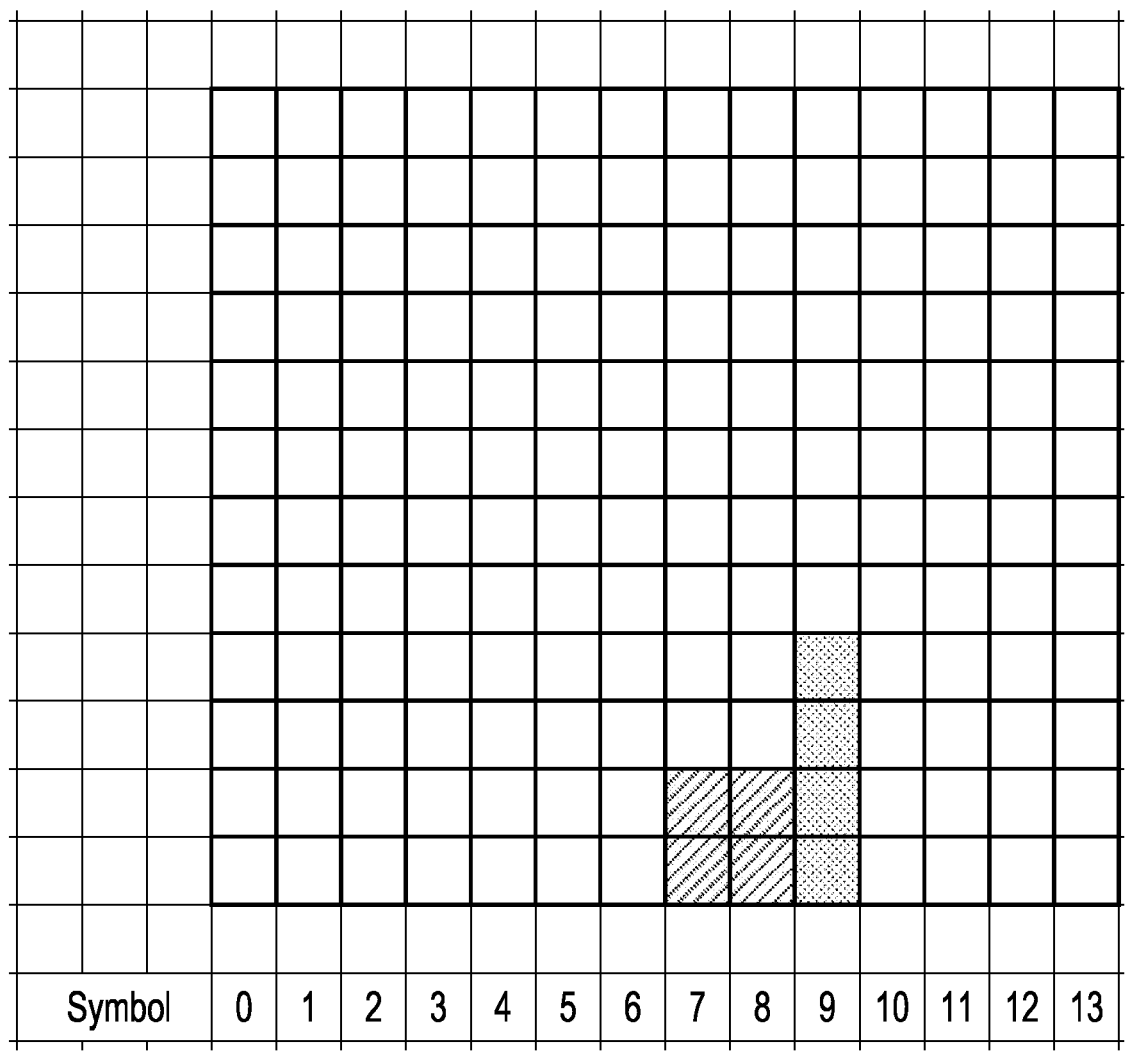
FIG. 2 illustrates an example of a CSI-RS pattern and a first CSI-IM pattern in a resource block for 4 transmission antenna ports.
Figure 6:
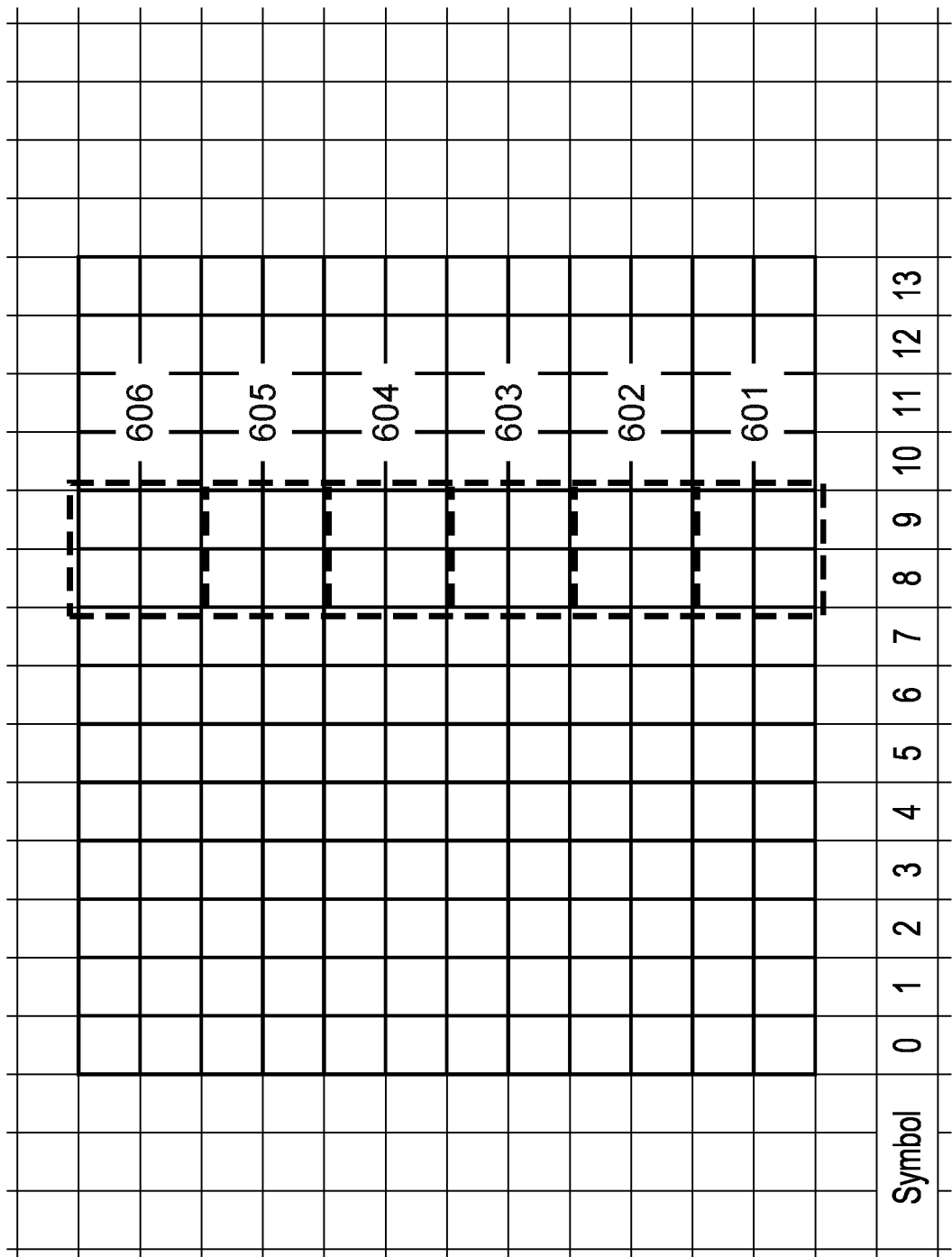
FIG. 6 illustrates CSI-IM time location within a resource block at symbols 8 and 9.

The CSI-IM resource may utilize resource elements in an MBSFN subframe. For example, the CSI-IM time location within a resource block may be changed from symbols 7 and 8 (as illustrated in FIG. 2) to symbols 8 and 9, as illustrated in FIG. 6. Symbol 7 may be avoided since it is used by PDSCH DMRS before a RRCReconfiguration message is received by UE. In other words, the one or more first OFDM symbols occupied by in the CSI-IM pattern overlap partially with the second OFDM symbol occupied by the CSI-RS pattern.

Figure 3:
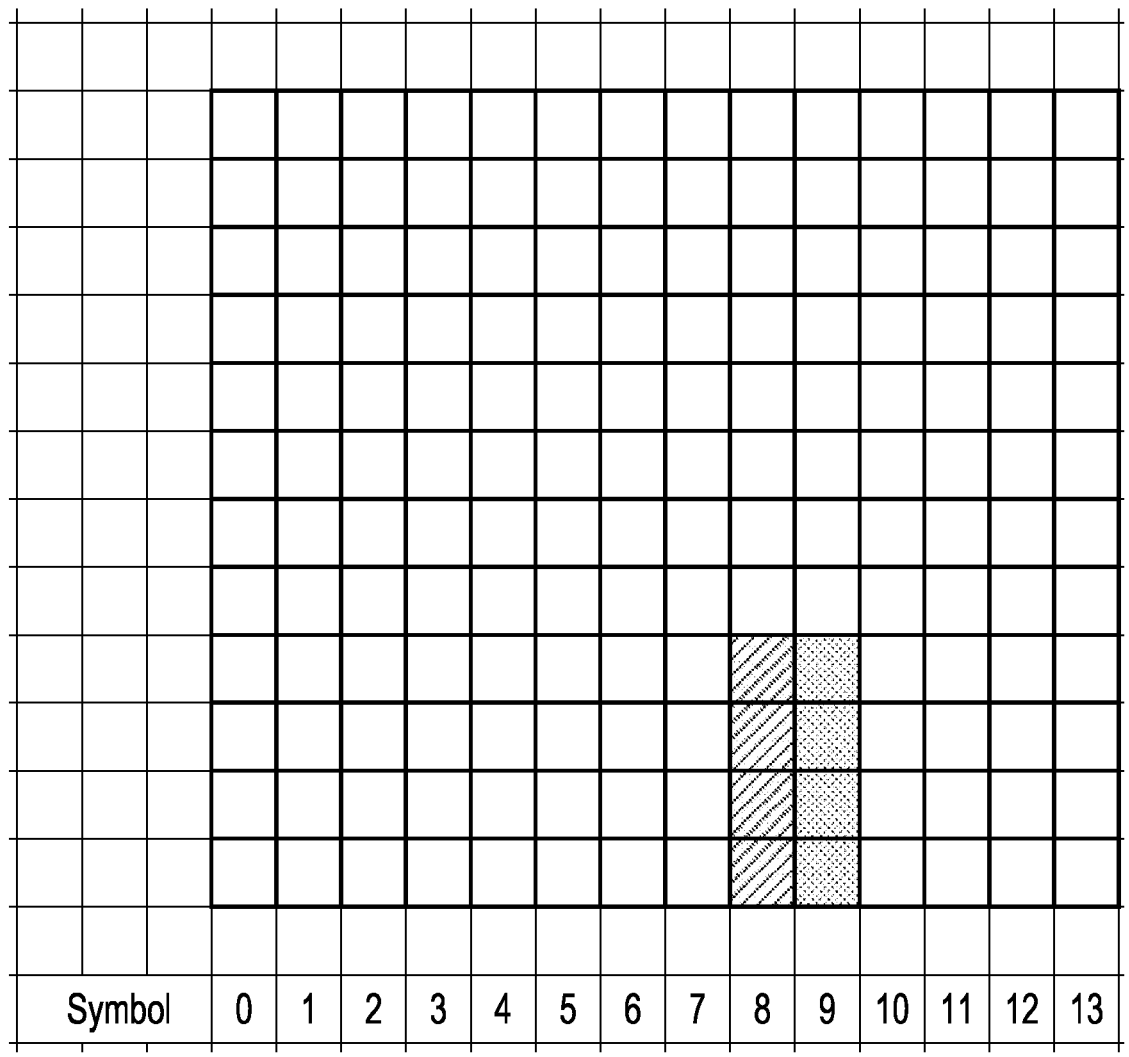
FIG. 3 illustrates an example of a CSI-RS pattern and a second CSI-IM pattern in a resource block for 4 transmission antenna ports.
Figure 4:
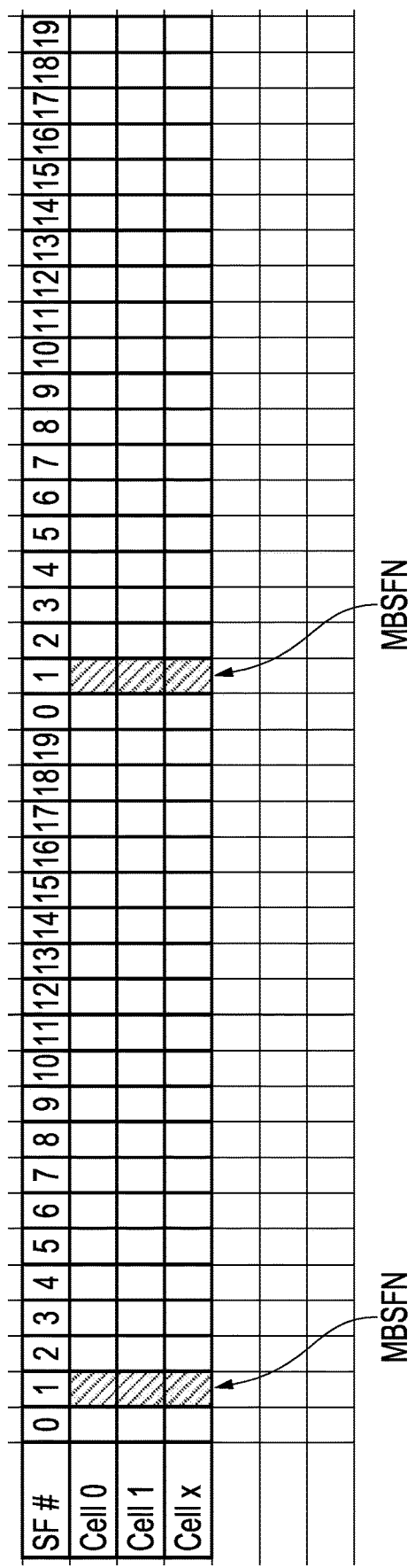
FIG. 4 illustrates MBSFN allocated in a fixed subframe which is aligned among all the cells.

The dashed squares in FIG. 6 indicate the possible frequency shifts for CSI-IM resources in a resource block (RB) where, in this example, there are 6 frequency shifts, 601 to 606. These CSI-IM resource locations enable the measurement of NR interference from NR CSI-RS. In this example therefore the at least one first time slot comprises symbol 9. In other words, as the NR CSI-RS from neighboring cells are transmitted during symbol 9 (e.g. as illustrated in FIGS. 2 and 3), by setting the CSI-IM resource locations to also be in symbol 9, the interference due to CSI-RS transmitted by neighboring cells may be measured.

The CSI-IM location in frequency domain (e.g the one or more first frequency shifts) may be cell specific and may be determined based on a cell identification (ID).

Figure 7:
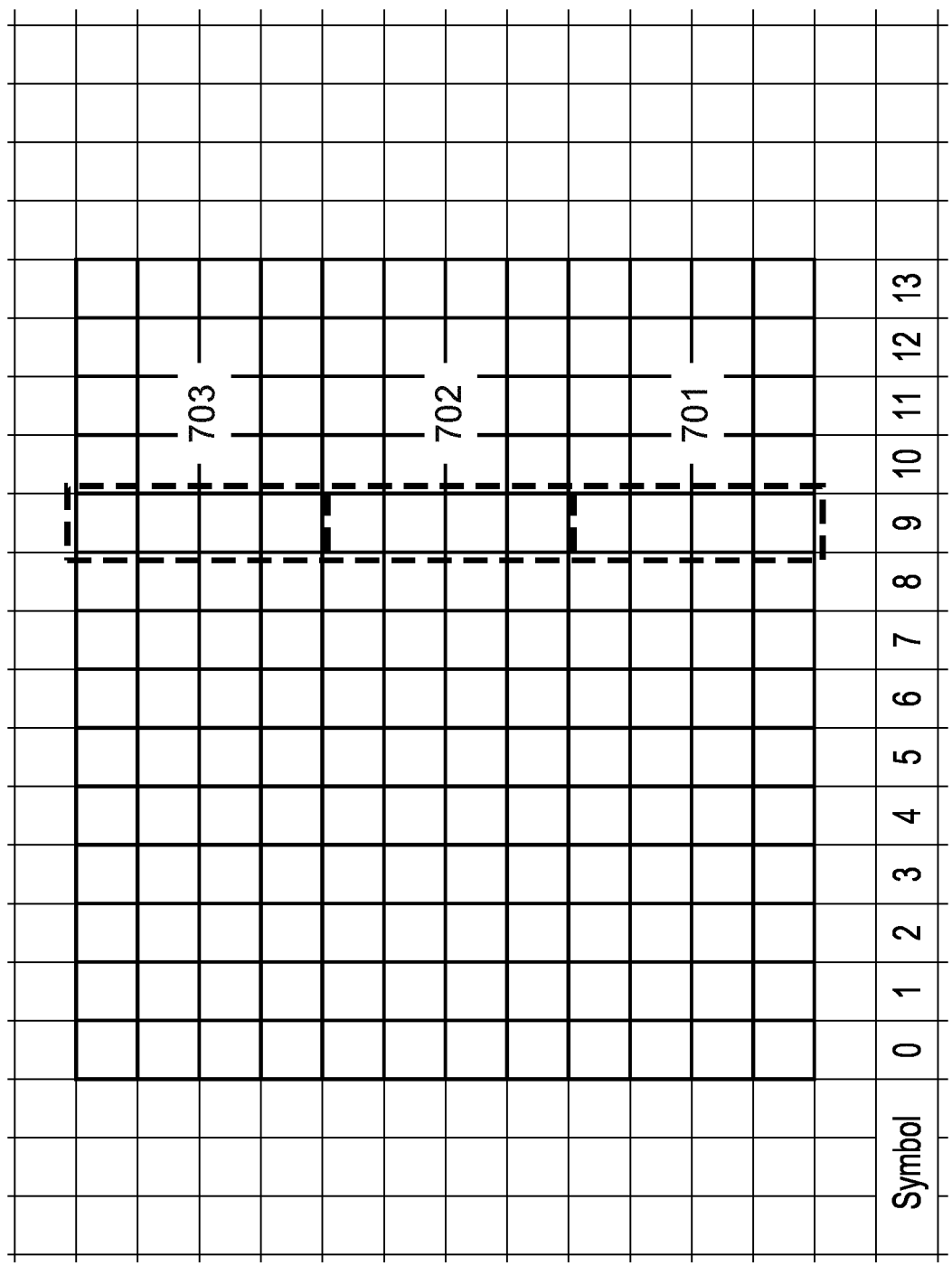
FIG. 7 illustrates an example of possible locations for the CSI-RS in an resource block.

FIG. 7 illustrates an example of possible locations for the CSI-RS in an RB. As described in step 502, the CSI-RS location comprises one or more frequency shifts. In the example of FIG. 7 there are 3 possible frequency shifts, 701, 702 and 703. The frequency domain location of the CSI-RS (e.g. the one or more second frequency shift) may be cell specific and may be determined from the cell ID.

Figure 8:
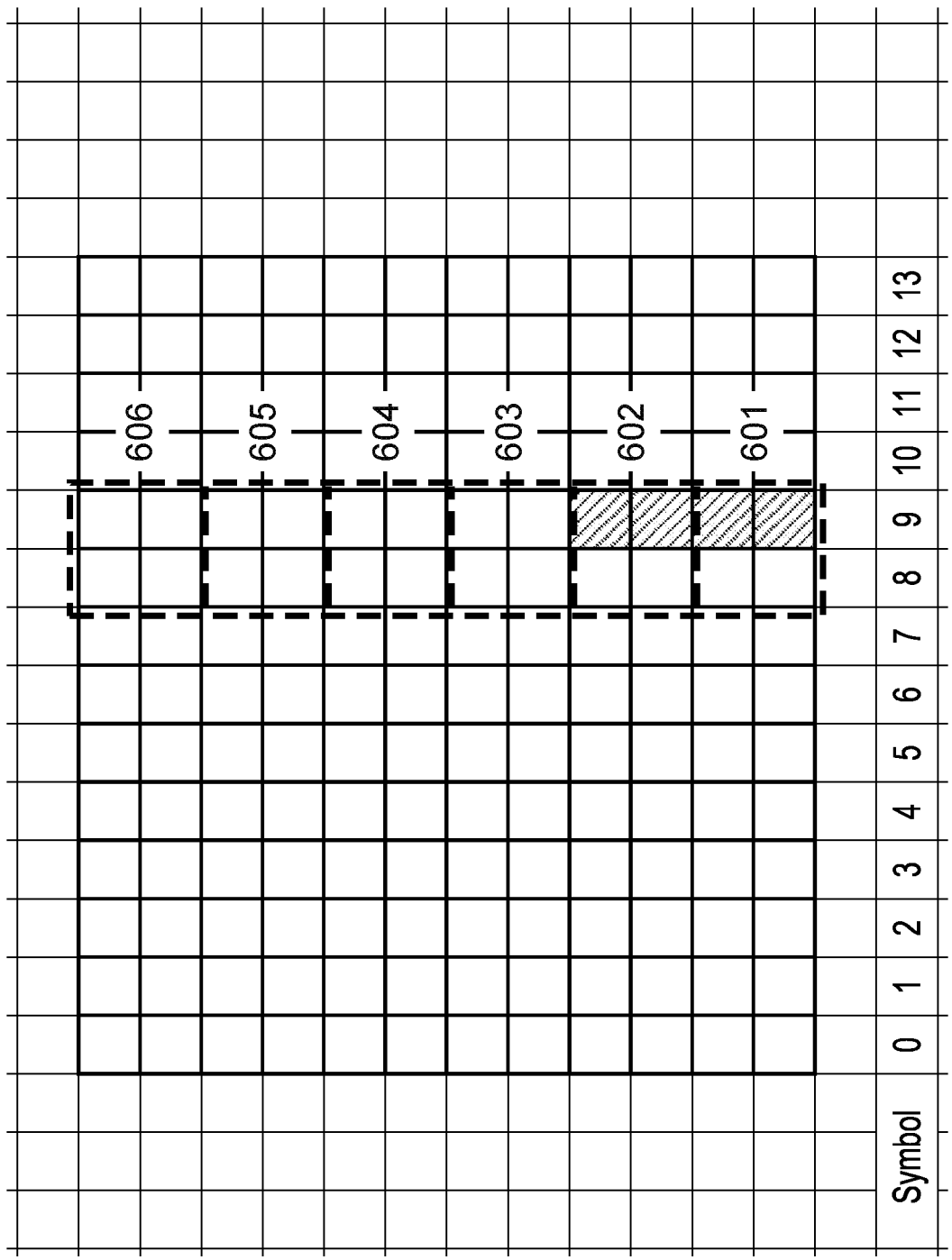
FIG. 8 illustrates an example in which the CSI-RS location is at frequency shift 701, in which case the frequency shifts 603 to 606 are allowed for CSI-IM, but frequency shifts 601 and 602 may not be allowed as they would overlap with the CSI-RS.

For example, for a specific cell with a given CSI-RS location, some CSI-IM frequency shifts may not be used since CSI-IM and CSI-RS from the same cell would overlap partially in time domain and the frequency domain. FIG. 8 illustrates an example in which the CSI-RS location is at frequency shift 701, in which case the frequency shifts 603 to 606 are allowed for CSI-IM, but frequency shifts 601 and 602 may not be allowed as they would overlap with the CSI-RS.

In some examples, mapping functions may be designed to avoid partial collision between CSI-RS resources and CSI-IM resources in the same cell As described above, the cell ID may be mapped to both the at least one first frequency shift for the CSI-IM and the at least one second frequency shift for the CSI-RS. For example, as illustrated in Table 1 below, the 6 possible frequency shifts for CSI-IM and 3 possible frequency shifts for CSI-RS may be mapped to the modulo 6 of the cell ID. The mapping functions defined by Table 1 below may therefore avoid the collision of CSI-RS and CSI-IM of the same cell.

TABLE 1

| Cell Id mod 6 | CSI-RS shift | CSI-IM shift |
| --- | --- | --- |
| 0 | 701 | 606 |
| 1 | 702 | 605 |
| 2 | 703 | 604 |
| 3 | 701 | 603 |
| 4 | 702 | 602 |
| 5 | 703 | 601 |

Figure 9:
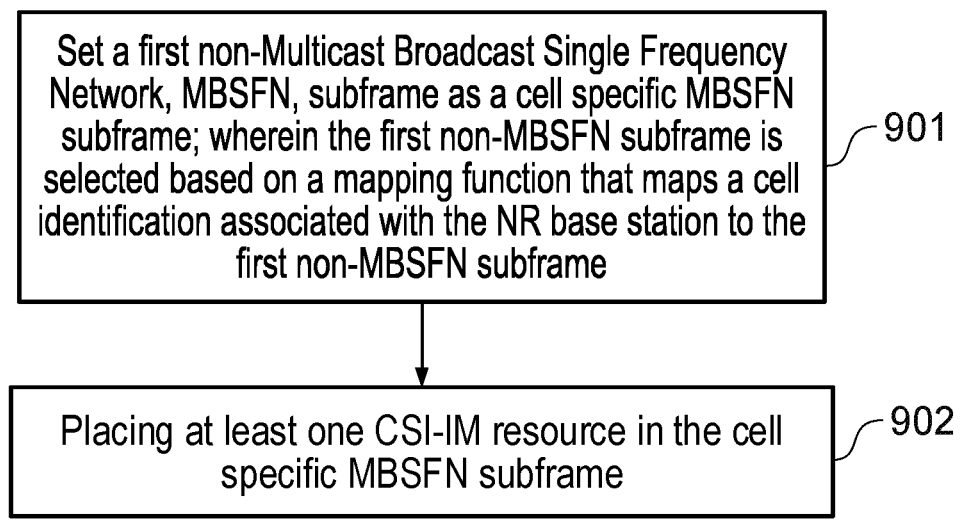
FIG. 9 illustrates a method in a new radio, NR, base station for determining Channel State Information Interference Measurement resources, CSI-IM resources, for interference measurement, wherein the NR base station is spectrum sharing with a Long Term Evolution, LTE, base station.

FIG. 9 illustrates a method in a new radio, NR, base station for determining Channel State Information Interference Measurement resources, CSI-IM resources, for interference measurement, wherein the NR base station is spectrum sharing with a Long Term Evolution, LTE, base station.

In step 901, the method comprises setting a first non-Multicast Broadcast Single Frequency Network, MBSFN, subframe as a cell specific MBSFN subframe; wherein the first non-MBSFN subframe is selected based on a mapping function that maps a cell identification associated with the NR base station to the first non-MBSFN subframe.

In step 902, the method comprises placing at least one CSI-IM resource in the cell specific MBSFN subframe.

In this proposal, at least one CSI-IM resource is placed in a cell specific MBSFN subframe. However, unlike other MBSFN subframes that are aligned among all cells, this cell specific MBSFN subframe is specific to the serving cell. As a result, the cell specific MBSFN subframe containing the CSI-IM resource in a serving cell is likely aligned with neighboring cell's regular or non-MBSFN subframe.

In this way, by placing at least one CSI-IM resource in the cell specific MBSFN subframe, a UE is able to measure interference from neighboring cell transmissions made during non-MBSFN subframes, which are more likely to include LTE transmissions.

In some example, the first non-MBSFN subframe is a subframe other than one of: a subframe with an LTE Physical Broadcast Channel, PBCH, or synchronization signal; a subframe with LTE system information blocks, SIBs; a subframe with LTE paging messages; or an existing MBSFN subframe.

In some examples, the method of FIG. 9 may comprise determining the first non-MBSFN subframe.

For example, the NR base station may determine a time window, wherein the time window is based on one of: a period of the CSI-IM or a minimum separation between two consecutive occurrences of CSI-IM. The NR base station may then identify non-MBSFN subframes within the time window; and selecting a set of candidate non-MBSFN CSI-IM subframes from the non-MBSFN subframes.

The NR base station may assign a unique subframe shift to each of the candidate CSI-IM subframes, and the mapping function utilized in step 901 may then map the cell identification associated with the NR base station to a first subframe shift. The candidate CSI-IM subframe with the subframe shift given by the mapping function may then be selected as the cell-specific MBSFN subframe for the NR base station.

Each CSI-IM location within the first non-MBSFN subframe may be identified by a time shift and a frequency shift. The time shift of CSI-IM resources for all cells may be the same in this case. The frequency shift of each CSI-IM may be determined based on a cell identification associated with the LTE base station.

The specific mapping function may be determined based on the way that cell IDs are configured to cells that are neighbors to each other. For example, if cells that are neighbors to each other are configured with consecutive integer cell IDs, and total of 8 candidate non-MBSFN subframes are selected, an example mapping function may be as defined by table 2.

TABLE 2

| Cell ID mod 8 | CSI-IM subframe shift |
| --- | --- |
| 0 | 7 |
| 1 | 6 |
| 2 | 5 |
| 3 | 4 |
| 4 | 3 |
| 5 | 2 |
| 6 | 1 |
| 7 | 0 |

Figure 10:
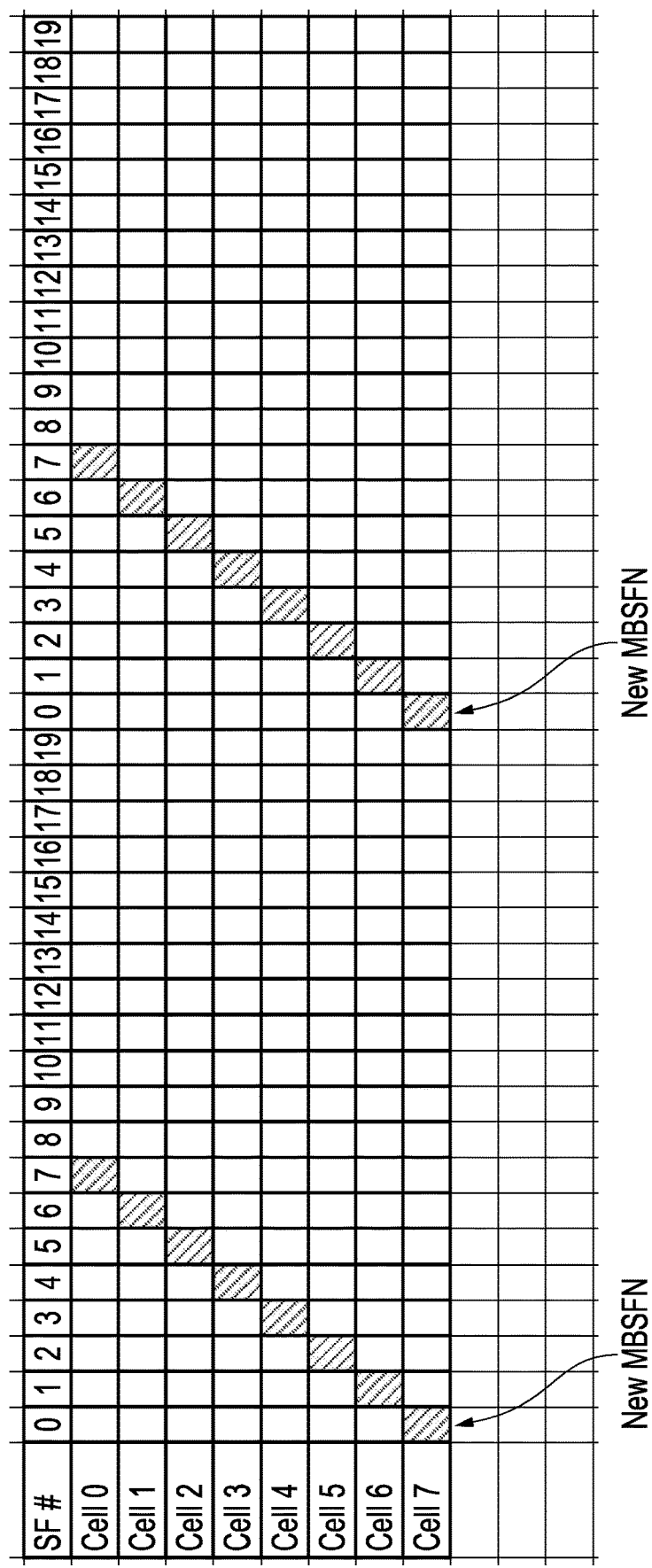
FIG. 10 illustrates an example of CSI-IM subframe shift.

An example of CSI-IM subframe shift is shown in FIG. 10 where 8 candidate non-MBSFN subframes are selected (in this examples subframes 0 to 7), and each candidate non-MBSFN subframe is set as a cell specific MBFSN subframe for a respective one of the cells (e.g. cells 0 to 7). The selected subframes for CSI-IM may be consecutive (as illustrated in FIG. 10) or may not be consecutive.

Figure 11:
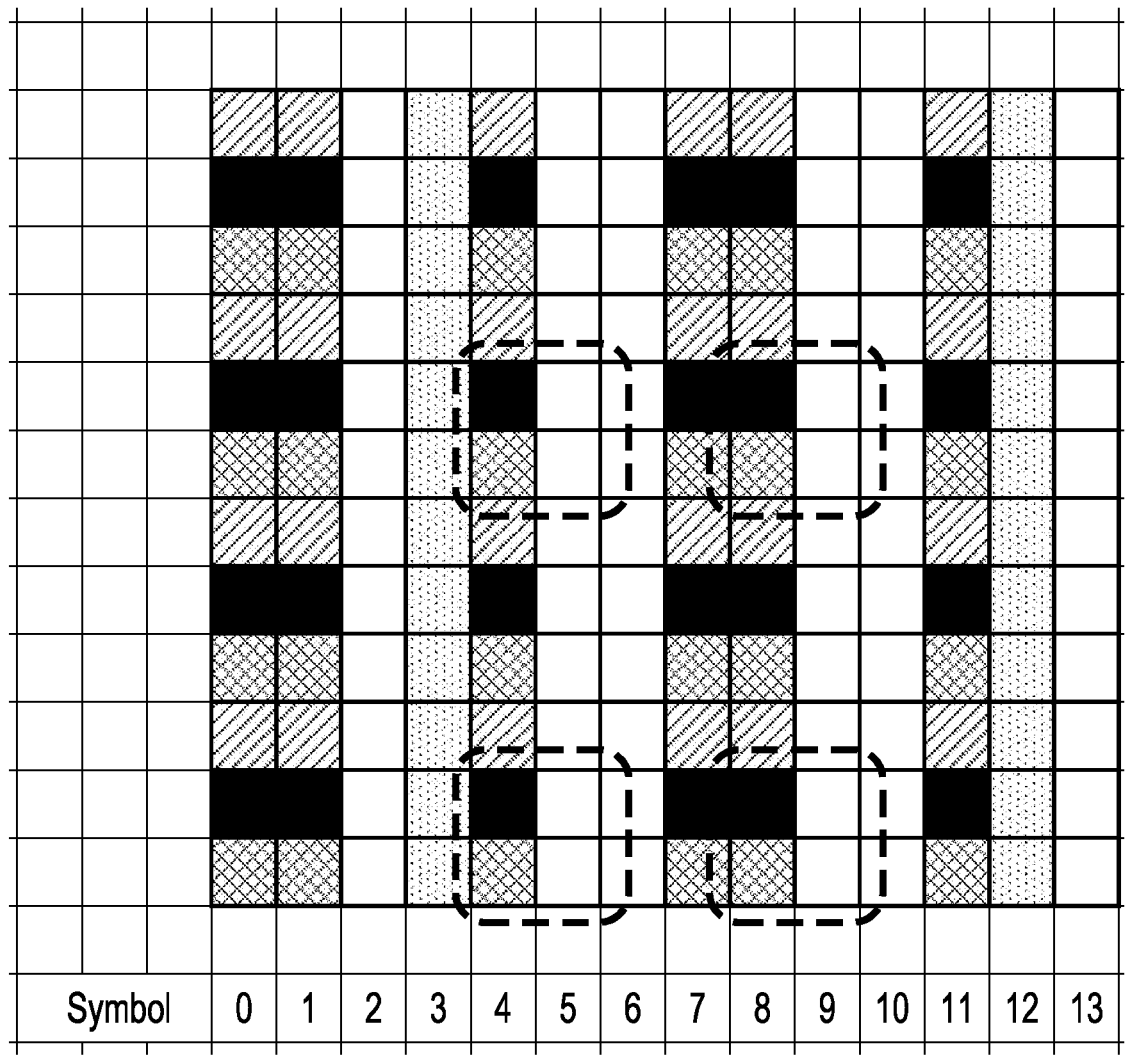
FIG. 11 illustrates possible CSI-IM locations within a resource block given a 2-port and 4-port LTE CRS.
Figure 12:
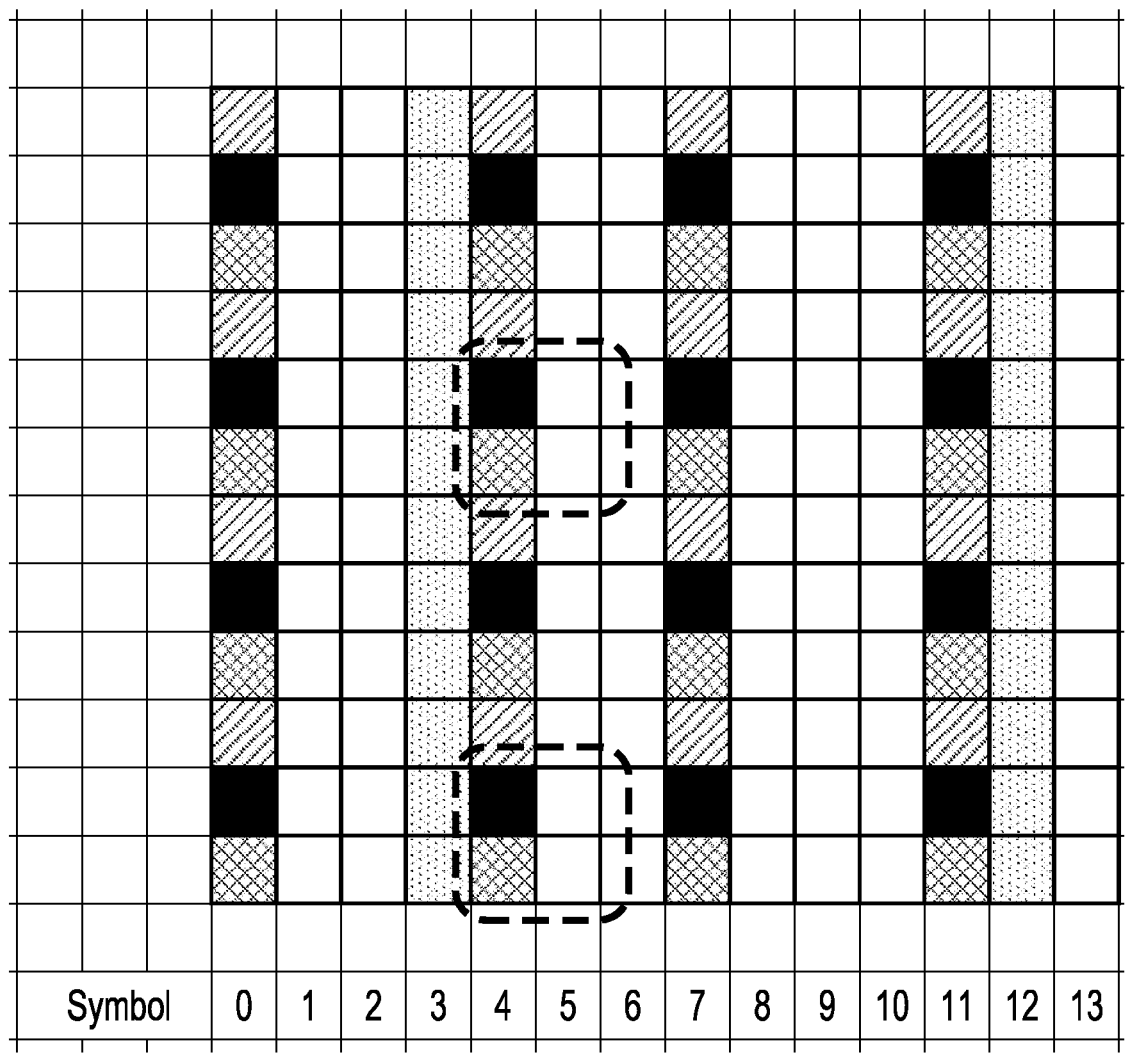
FIG. 12 illustrates possible CSI-IM locations within a resource block given a 2-port and 4-port LTE CRS.

FIGS. 11 and 12 illustrate possible CSI-IM locations within a resource block given a 2-port and 4-port LTE CRS. In these examples, the possible CSI-IM resource locations within the resource block have been carefully chosen such that some resource elements of the CSI-IM locations overlap with LTE CRS of neighboring cells, while other resources elements are in the PDSCH region of neighboring cells. Depending on whether LTE PDSCH or NR PDSCH is scheduled, interference from either LTE PDSCH or NR PDSCH may be measured.

In FIGS. 11 and 12. The stripped resource elements are used for the CRS for the serving ESS cell. The location of the CSI-IM resource elements may therefore avoid these stripped resource elements in order to avoid collision with the LTE CRS transmissions of the serving LTE cell. The cross-hatched resource elements are used for LTE CRS transmissions by neighbor cells with certain frequency shifts while the solid REs are used for LTE CRS transmissions by neighbor cells with different frequency shifts. Symbols 3 and 12 are used for NR DMRS and may therefore not be selected for CSI-IM.

The dotted boxes in FIGS. 11 and 12 indicate possible CSI-IM resource locations. In this examples, the CSI-IM resource locations are deliberately chosen to overlap with the LTS CRS transmissions made by neighbor cells in order to account for possible interference from the LTE CRS transmissions made by neighbor cells. Although multiple possible CSI-IM locations in a RB are shown, one time shift may be selected and may be used for all cells. The frequency shift of the CSI-IM may be determined based on the cell identification of the associated LTE base station. The frequency shift may be determined so that the CRS REs of the serving LTE cell are avoided.

Figure 13:
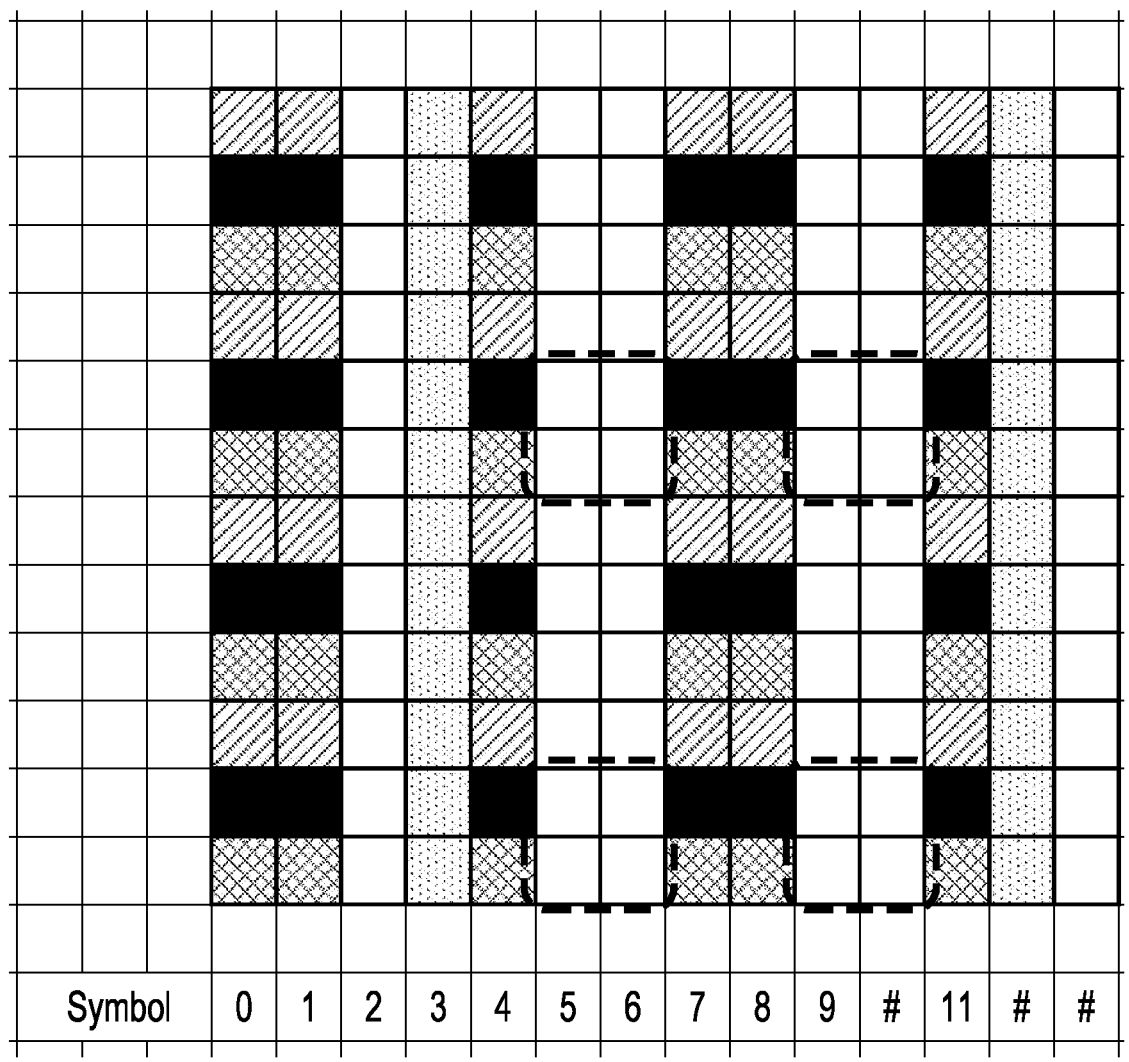
FIG. 13 illustrates examples in which CSI-IM resource locations does not overlap with the LTE CRS resources of neighbor cells.
Figure 14:
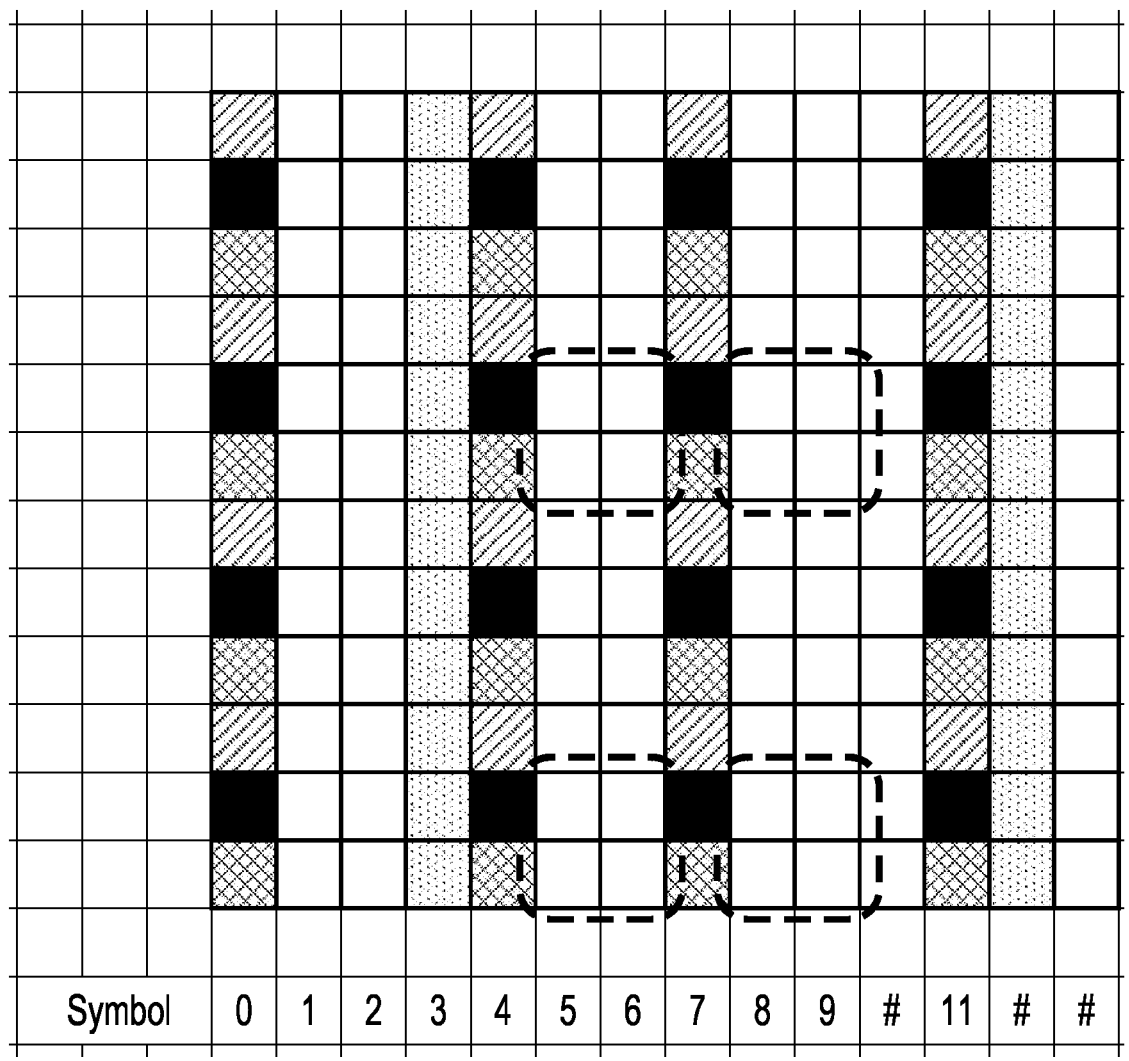
FIG. 14 illustrates examples in which CSI-IM resource locations do not overlap with the LTE CRS resources of neighbor cells.

It will however, be appreciated that in some embodiments, the CSI-IM resource location may not overlap with the LTE CRS resources of neighbor cells. For example, as illustrated in FIGS. 13 and 14. In this case, one common time shift and one common frequency shift may be used for all cells. In other words, the CSI-IM location in a RB may be fixed.

It will be appreciated that in some embodiments the location of each CSI-IM resource within the first non-MBSFN subframe is determined such that CRS transmissions of the LTE base station are avoided; and/or NR DMRS symbols for PDSCH before and after Radio Resource Control, RRC, Reconfiguration are avoided.

In summary, by placing CSI-IM resources in a cell specific MBSFN subframe, a user equipment may be able to measure interference not only from NR PDSCH if NR PDSCH is scheduled, but also from LTE PDSCH if LTE PDSCH is scheduled and LTE CRS if the CSI-IM location within the resource block overlaps with the LTE CRS of the neighboring cells.

The interference measured by a user equipment on CSI-IM resources placed according to the method of FIG. 9 may therefore reflect LTE/NR traffic loading.

FIG. 15 illustrates a method in a new radio, NR, base station for determining Channel State Information Interference Measurements resources, CSI-IMs resources, for interference measurement, wherein the NR base station is spectrum sharing with a Long Term Evolution, LTE, base station.

In step 1501 the method comprises determining one or more CSI-IM resources according to a CSI-IM pattern; wherein the one or more CSI-IM resources are placed in a first non-Multicast Broadcast Single Frequency Network, MBSFN, subframe, and wherein the first non-MBSFN subframe is determined utilizing a mapping function that maps a cell identification of the NR base station to the first non-MBSFN subframe.

In some embodiments the CSI-IM locations within a subframe are selected in a manner similar to the approach used when CSI-IM is in a MBSFN subframe. For example, CSI-IM resources for different cells may be placed in different subframes. The time shift for CSI-IM of all cells may be the same. The frequency shift for CSI-IM of all cells may be different, for example, if it is intended to measure interference from LTE CRS of the neighbor LTE cells. The frequency shift for CSI-IM of all cells may be the same, for example, if it is not intended to measure interference from LTE CRS of the neighbor LTE cells.

However, in some embodiments multiple subframes and multiple locations within a subframe may be selected for CSI-IM resources. In this case, the mapping function may further map the cell identification of the NR base station to a specific time location within the first non-MBSFN subframe.

In some embodiments the method may further comprise determining a time window, wherein the time window is based on one of: a period of the CSI-IM or a minimum separation between two consecutive occurrences of CSI-IM.

The method may then comprise identifying non-MBSFN subframes within the time window; and selecting a set of candidate non-MBSFN CSI-IM subframes from the non-MBSFN subframes.

Since in the embodiments of FIG. 15, CSI-IM is now placed in a regular or non-MBSFN subframe, it would seem that CSI-IM may be placed in any subframe. However, in some embodiments, the subframe to place CSI-IM and CSI-IM locations may be selected such that the important LTE signals/channels like LTE CRS, synchronization signals, PBCH, SIBs and paging do not collide with CSI-IM.

In addition, collision between CSI-IM and NR DMRS may also be avoided. It will be appreciated that the DMRS locations can be different before and after UE receives RRCReconfiguration message. It may also be preferable that CSI-IM overlaps with LTE CRS of the neighbor cells so that CRS interference is measured. For this purpose, the subframes in which LTE SIBs and paging message are transmitted may be avoided. Similarly, subframes in which LTE synchronization signals and PBCH are transmitted may also be avoided.

The candidate subframes may therefore comprise subframes which are not avoided as described above.

The method may then further comprise assigning a unique subframe shift to each of the candidate CSI-IM subframes, wherein the mapping function maps the cell identification associated with the NR base station to a first subframe shift. It will be appreciated that different cell identifications may map to the same subframe shift. However, the mapping function may be designed such that neighboring cells do not map to the same subframe shifts.

In some embodiments, the CSI-IM location within the first non-MBSFN subframe is fixed, however, in some examples, each CSI-IM location within the first non-MBSFN subframe is identified by a time shift and a frequency shift. The time shift of each CSI-IM may be determined based on a cell identification associated with the NR base station. The frequency shift of each CSI-IM may be determined based on a cell identification associated with the LTE base station.

It may not be possible to avoid subframes in which LTE CRS is transmitted since CRS is transmitted in every subframe. However, the CSI-IM location in the subframe may be selected to avoid using the serving cell CRS REs. It may also be preferable for CSI-IM to avoid symbols used for NR DMRS. For example, CSI-IM may avoid symbols 3, 7, 11 and/or 12, which could be used by NR DMRS. In other words, the time shifts identified by the mapping function may not include symbols 3, 7 11 and/or 12.

As described earlier, the CSI-IM locations within a subframe may be selected so that CSI-IM resources don't collide with important LTE signals. However, it may not be possible to avoid collision with LTE PDSCH. When CSI-IM collides with LTE PDSCH, the LTE PDSCH may be punctured at the location of CSI-IM. In other words, when performing resource mapping for LTE PDSCH, the REs used for CSI-IM may be assumed to be available to LTE PDSCH (even though they are not). However, when LTE PDSCH is transmitted, no energy is transmitted on the REs used by CSI-IM. In this case, the modulation and coding scheme for LTE PDSCH may need to be adjusted to compensate the loss of those REs.

Figure 16:
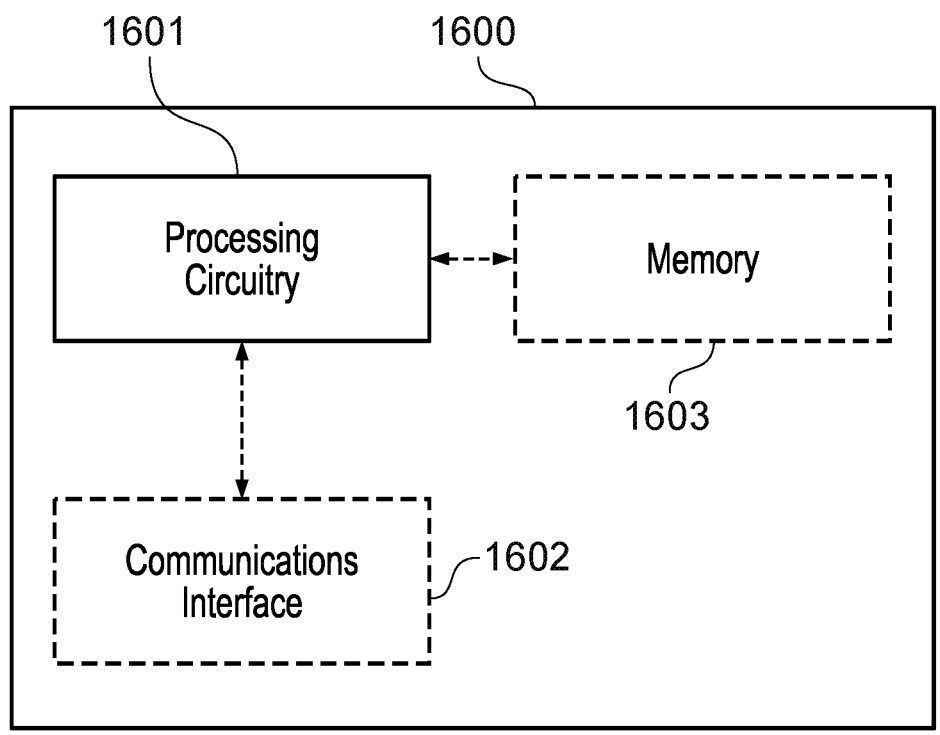
FIG. 16 illustrates a new radio, NR, base station comprising processing circuitry (or logic)

FIG. 16 illustrates a new radio, NR, base station 1600 comprising processing circuitry (or logic) 1601. The processing circuitry 1601 controls the operation of the NR base station 1600 and can implement the method described herein in relation to an NR base station 1600. The processing circuitry 1601 can comprise one or more processors, processing units, multi-core processors or modules that are configured or programmed to control the NR base station 1600 in the manner described herein. In particular implementations, the processing circuitry 1601 can comprise a plurality of software and/or hardware modules that are each configured to perform, or are for performing, individual or multiple steps of the method described herein in relation to the NR base station 1600.

Briefly, the processing circuitry 1601 of the NR base station 1600 is configured to: determine a CSI-IM pattern for a CSI-IM resource, wherein the CSI-IM pattern is defined by one or more first OFDM symbols and a first frequency shift; and transmit a Channel State Information Reference Signal, CSI-RS, according to a CSI-RS pattern, wherein the CSI-RS pattern is defined by a second OFDM symbol and a second frequency shift, wherein the first frequency shift and the second frequency shift do not overlap and wherein the one or more first OFDM symbols overlap with the second OFDM symbol.

In some embodiments, the NR base station 1600 may optionally comprise a communications interface 1602. The communications interface 1602 of the NR base station 1600 can be for use in communicating with other nodes, such as other virtual nodes. For example, the communications interface 1602 of the NR base station 1600 can be configured to transmit to and/or receive from other nodes requests, resources, information, data, signals, or similar. The processing circuitry 1601 of NR base station 1600 may be configured to control the communications interface 1602 of the NR base station 1600 to transmit to and/or receive from other nodes requests, resources, information, data, signals, or similar.

Optionally, the NR base station 1600 may comprise a memory 1603. In some embodiments, the memory 1603 of the NR base station 1600 can be configured to store program code that can be executed by the processing circuitry 1601 of the NR base station 1600 to perform the method described herein in relation to the NR base station 1600. Alternatively or in addition, the memory 1603 of the NR base station 1600, can be configured to store any requests, resources, information, data, signals, or similar that are described herein. The processing circuitry 1601 of the NR base station 1600 may be configured to control the memory 1603 of the NR base station 1600 to store any requests, resources, information, data, signals, or similar that are described herein.

Figure 17:
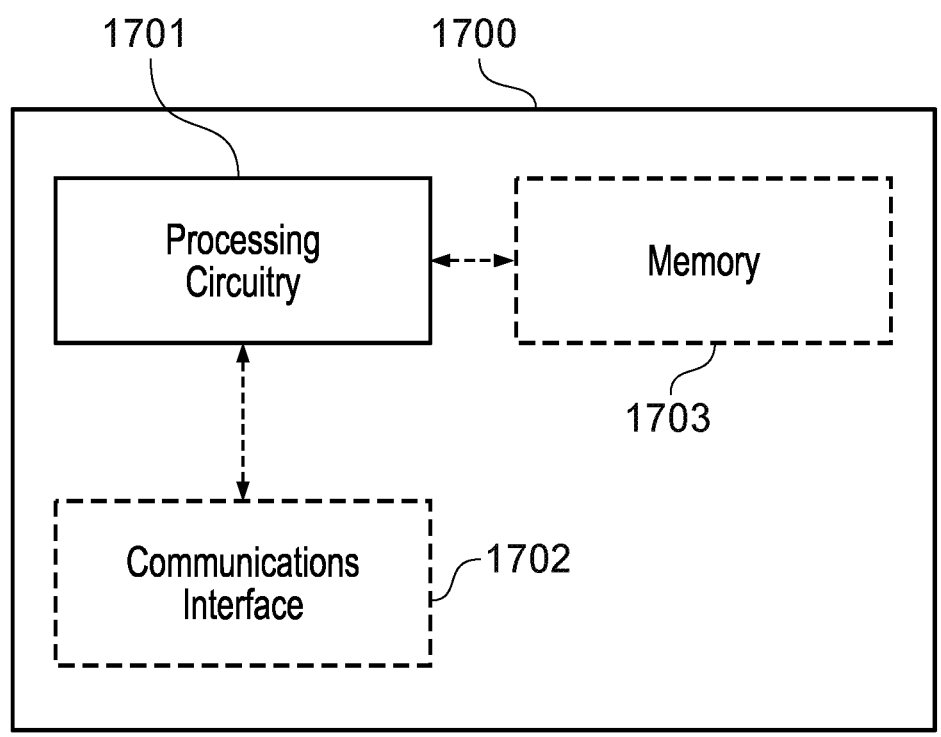
FIG. 17 illustrates a new radio, NR, base station comprising processing circuitry (or logic)

FIG. 17 illustrates a new radio, NR, base station 1700 comprising processing circuitry (or logic) 1701. The processing circuitry 1701 controls the operation of the NR base station 1700 and can implement the method described herein in relation to an NR base station 1700. The processing circuitry 1701 can comprise one or more processors, processing units, multi-core processors or modules that are configured or programmed to control the NR base station 1700 in the manner described herein. In particular implementations, the processing circuitry 1701 can comprise a plurality of software and/or hardware modules that are each configured to perform, or are for performing, individual or multiple steps of the method described herein in relation to the NR base station 1700.

Briefly, the processing circuitry 1701 of the NR base station 1700 is configured to: set a first non-Multicast Broadcast Single Frequency Network, MBSFN, subframe as a cell specific MBSFN subframe; wherein the first non-MBSFN subframe is selected based on a mapping function that maps a cell identification associated with the NR base station to the first non-MBSFN subframe; and place at least one CSI-IM resource in the cell specific MBSFN subframe.

In some embodiments, the NR base station 1700 may optionally comprise a communications interface 1702. The communications interface 1702 of the NR base station 1700 can be for use in communicating with other nodes, such as other virtual nodes. For example, the communications interface 1702 of the NR base station 1700 can be configured to transmit to and/or receive from other nodes requests, resources, information, data, signals, or similar. The processing circuitry 1701 of NR base station 1700 may be configured to control the communications interface 1702 of the NR base station 1700 to transmit to and/or receive from other nodes requests, resources, information, data, signals, or similar.

Optionally, the NR base station 1700 may comprise a memory 1703. In some embodiments, the memory 1703 of the NR base station 1700 can be configured to store program code that can be executed by the processing circuitry 1701 of the NR base station 1700 to perform the method described herein in relation to the NR base station 1700. Alternatively or in addition, the memory 1703 of the NR base station 1700, can be configured to store any requests, resources, information, data, signals, or similar that are described herein. The processing circuitry 1701 of the NR base station 1700 may be configured to control the memory 1703 of the NR base station 1700 to store any requests, resources, information, data, signals, or similar that are described herein.

Figure 18:
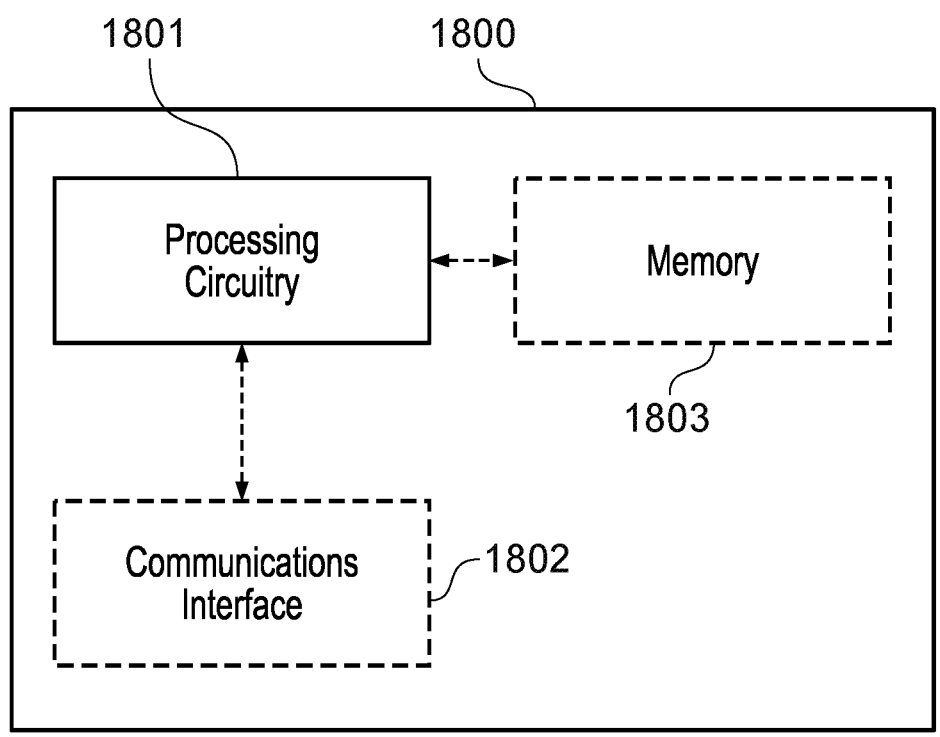
FIG. 18 illustrates a new radio, NR, base station comprising processing circuitry (or logic).

FIG. 18 illustrates a new radio, NR, base station 1800 comprising processing circuitry (or logic) 1801. The processing circuitry 1801 controls the operation of the NR base station 1800 and can implement the method described herein in relation to an NR base station 1800. The processing circuitry 1801 can comprise one or more processors, processing units, multi-core processors or modules that are configured or programmed to control the NR base station 1800 in the manner described herein. In particular implementations, the processing circuitry 1801 can comprise a plurality of software and/or hardware modules that are each configured to perform, or are for performing, individual or multiple steps of the method described herein in relation to the NR base station 1800.

Briefly, the processing circuitry 1801 of the NR base station 1800 is configured to: determine one or more CSI-IM resources according to a CSI-IM pattern; wherein the one or more CSI-IM resources is placed in a first non-Multicast Broadcast Single Frequency Network, MBSFN, subframe, and wherein the first non-MBSFN subframe is determined utilizing a mapping function that maps a cell identification of the NR base station to the first non-MBSFN subframe.

In some embodiments, the NR base station 1800 may optionally comprise a communications interface 1802. The communications interface 1802 of the NR base station 1800 can be for use in communicating with other nodes, such as other virtual nodes. For example, the communications interface 1802 of the NR base station 1800 can be configured to transmit to and/or receive from other nodes requests, resources, information, data, signals, or similar. The processing circuitry 1801 of NR base station 1800 may be configured to control the communications interface 1802 of the NR base station 1800 to transmit to and/or receive from other nodes requests, resources, information, data, signals, or similar.

Optionally, the NR base station 1800 may comprise a memory 1803. In some embodiments, the memory 1803 of the NR base station 1800 can be configured to store program code that can be executed by the processing circuitry 1801 of the NR base station 1800 to perform the method described herein in relation to the NR base station 1800. Alternatively or in addition, the memory 1803 of the NR base station 1800, can be configured to store any requests, resources, information, data, signals, or similar that are described herein. The processing circuitry 1801 of the NR base station 1800 may be configured to control the memory 1803 of the NR base station 1800 to store any requests, resources, information, data, signals, or similar that are described herein.

Embodiments described herein result in more accurate CSI estimation from wireless devices, which may in turn result in higher throughput.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a new radio, NR, base station for determining Channel State Information Interference Measurement resources, CSI-IM resources, for interference measurement, the NR base station spectrum sharing with a Long Term Evolution, LTE, base station, the method comprising:
determining a CSI-IM pattern for a CSI-IM resource, wherein the CSI-IM pattern is defined by one or more first OFDM symbols and a first frequency shift; and
transmitting a Channel State Information Reference Signal, CSI-RS, according to a CSI-RS pattern, the CSI-RS pattern being defined by a second OFDM symbol and a second frequency shift, the first frequency shift and the second frequency shift do not overlap and the one or more first OFDM symbols overlap with the second OFDM symbol.

2. The method as claimed in claim 1, wherein at least one of the CSI-IM frequency shift and the CSI-RS frequency shift are determined based on a cell identification associated with the NR base station.

3. The method as claimed in claim 1, wherein the one or more first OFDM symbols in the CSI-IM pattern overlap with the second OFDM symbol occupied by the CSI-RS pattern.

4. A method in a new radio, NR, base station for determining Channel State Information Interference Measurement resources, CSI-IM resources, for interference measurement, the NR base station spectrum sharing with a Long Term Evolution, LTE, base station, the method comprising:
setting a first non-Multicast Broadcast Single Frequency Network, MBSFN, subframe as a cell specific MBSFN subframe, the first non-MBSFN subframe being selected based on a mapping function that maps a cell identification associated with the NR base station to the first non-MBSFN subframe; and
placing at least one CSI-IM resource in the cell specific MBSFN subframe.

5. The method as claimed in claim 4, wherein the first non-MBSFN subframe is a subframe other than one of: a subframe with an LTE Physical Broadcast Channel, PBCH, or synchronization signal; a subframe with LTE system information blocks, SIBs; a subframe with LTE paging messages; or an existing MBSFN subframe.

6. The method as claimed in claim 4, further comprising determining a time window, wherein the time window is based on one of: a period of the at least one CSI-IM or as minimum separation between two consecutive occurrences of at least one CSI-IM.

7. The method as claimed in claim 6, further comprising:
identifying a plurality of non-MBSFN subframes within the time window; and
selecting a set of candidate CSI-IM subframes from the non-MBSFN subframes.

8. The method as claimed in claim 7, further comprising assigning a unique subframe shift to each of the candidate CSI-IM subframes, wherein the mapping function maps the cell identification associated with the NR base station to a first subframe shift.

9. The method as claimed in claim 4 wherein each CSI-IM resource in the cell specific MBSFN subframe has a fixed time location.

10. The method as claimed in claim 4, wherein each CSI-IM resource in the cell specific MBSFN subframe has a frequency shift that is one of fixed and determined based on a cell identification of an LTE base station.

11. The method as claimed in claim 1, wherein a location of each CSI-IM within the cell specific MBSFN subframe is determined based on one or more of the following criteria:
avoiding CRS transmissions of the LTE base station; and
avoiding NR DMRS symbols for PDSCH before and after Radio Resource Control, RRC, Reconfiguration.

12. A method in a new radio, NR, base station for determining Channel State Information Interference Measurement resources, CSI-IM resources, for interference measurement, the NR base station spectrum sharing with a Long Term Evolution, LTE, base station, the method comprising:
determining one or more CSI-IM resources according to a CSI-IM pattern, the one or more CSI-IM resources being placed in a first non-Multicast Broadcast Single Frequency Network, MBSFN, subframe, and the first non-MBSFN subframe being determined utilizing a mapping function that maps a cell identification of the NR base station to the first non-MBSFN subframe.

13. The method as claimed in claim 12, wherein the mapping function further maps the cell identification of the NR base station to one specific time locations within the first non-MBSFN subframe.

14. The method as claimed in claim 12, further comprising determining a time window, wherein the time window is based on one of: a period of the CSI-IM or as minimum separation between two consecutive occurrences of CSI-IM.

15. The method as claimed in claim 14, further comprising:
identifying non-MBSFN subframes within the time window; and
selecting a set of candidate non-MBSFN CSI-IM subframes from the non-MBSFN subframes.

16. The method as claimed in claim 15, further comprising assigning a unique subframe shift to each of the candidate CSI-IM subframes, wherein the mapping function maps the cell identification associated with the NR base station to a first subframe shift.

17. The method as claimed in claim 12, wherein each CSI-IM location within the first non-MBSFN subframe is identified by a time shift and a frequency shift.

18. The method as claimed in claim 17, wherein the time shift of each CSI-IM is one of fixed and determined based on a cell identification associated with the NR base station.

19. The method as claimed in claim 17, wherein the frequency shift of each CSI-IM is one of fixed and determined based on a cell identification associated with the LTE base station.

20. The method as claimed in claim 12, wherein a location of each CSI-IM within the first non-MBSFN subframe is determined based on one or more of the following criteria:
   avoiding CRS transmissions of the LTE base station; and
   avoiding NR DMRS symbols for PDSCH before and after Radio Resource Control, RRC, Reconfiguration.

21. A new radio, NR, base station for determining Channel State Information Interference Measurement resources, CSI-IM resources, for interference measurement, the NR base station spectrum sharing with a Long Term Evolution, LTE, base station, the NR base station comprising processing circuitry configured to:
   determine a CSI-IM pattern for a CSI-IM resource, the CSI-IM pattern defined by one or more first OFDM symbols and a first frequency shift; and
   transmit a Channel State Information Reference Signal, CSI-RS, according to a CSI-RS pattern, the CSI-RS pattern being defined by a second OFDM symbol and a second frequency shift, the first frequency shift and the second frequency shift do not overlap and the one or more first OFDM symbols overlap with the second OFDM symbol.

22. The NR base station as claimed in claim 20, wherein at least one of the CSI-IM frequency shift and the CSI-RS frequency shift are determined based on a cell identification associated with the NR base station.

23. A new radio, NR, base station for determining Channel State Information Interference Measurement resources, CSI-IM resources, for interference measurement, the NR base station spectrum sharing with a Long Term Evolution, LTE, base station, the NR base station comprising processing circuitry configured to:
   set a first non-Multicast Broadcast Single Frequency Network, MBSFN, subframe as a cell specific MBSFN subframe, the first non-MBSFN subframe being selected based on a mapping function that maps a cell identification associated with the NR base station to the first non-MBSFN subframe; and
   place at least one CSI-IM resource in the cell specific MBSFN subframe.

24. The NR base station as claimed in claim 23, wherein the first non-MBSFN subframe is a subframe other than one of: a subframe with an LTE Physical Broadcast Channel, PBCH, or synchronization signal; a subframe with LTE system information blocks, SIBs; a subframe with LTE paging messages; or an existing MBSFN subframe.

25. A new radio, NR, base station for determining Channel State Information Interference Measurement resources, CSI-IM resources, for interference measurement, the NR base station spectrum sharing with a Long Term Evolution, LTE, base station, the NR base station comprising processing circuitry configured to:
   determine one or more CSI-IM resources according to a CSI-IM pattern, the one or more CSI-IM resources are placed in a first non-Multicast Broadcast Single Frequency Network, MBSFN, subframe, and the first non-MBSFN subframe being determined utilizing a mapping function that maps a cell identification of the NR base station to the first non-MBSFN subframe.

26. The NR base station as claimed in claim 25, wherein the mapping function further maps the cell identification of the NR base station to one specific time locations within the first non-MBSFN subframe.

* * * * *